July 21, 1942.  A. O. WILLIAMS  2,290,661
RESILIENT WHEEL
Filed May 23, 1938
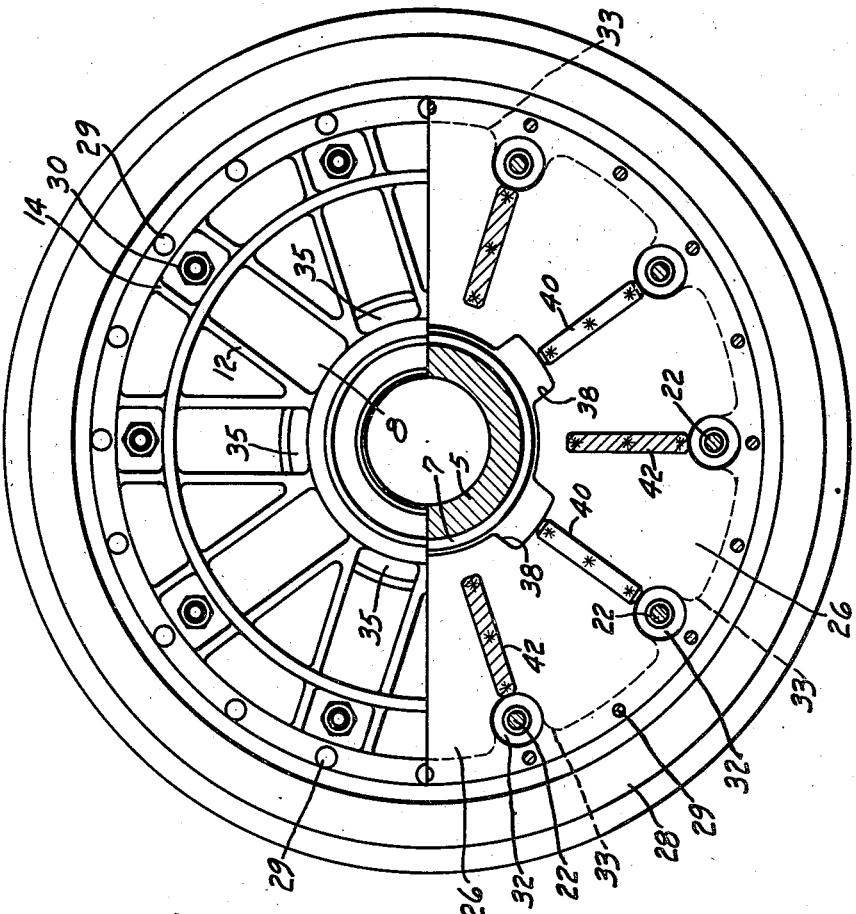
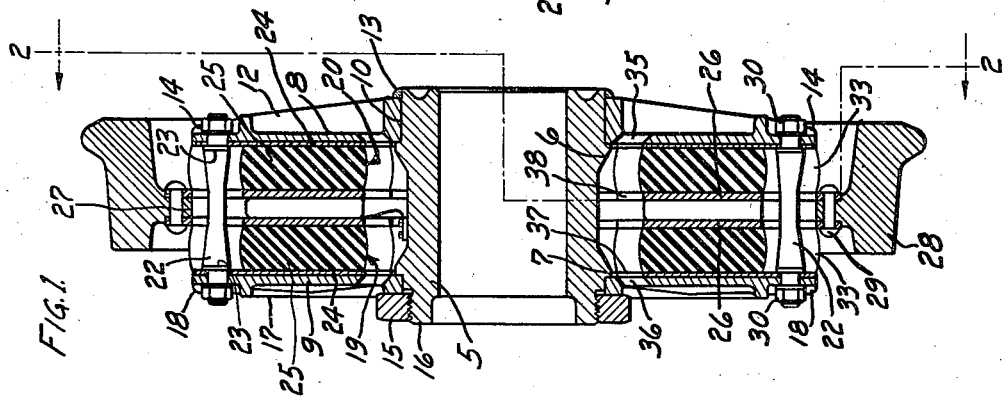
INVENTOR.
ALFRED O. WILLIAMS.
BY Walter E. Schirmer
ATTORNEY.

Patented July 21, 1942

2,290,661

UNITED STATES PATENT OFFICE 2,290,661

RESILIENT WHEEL

Alfred O. Williams, Battle Creek, Mich., assignor to Clark Equipment Company, Battle Creek, Mich., a corporation of Michigan Application May 23, 1938, Serial No. 209,474

16 Claims. (Cl. 295—11)

This invention relates to resilient wheels of the type employed on rail vehicles such as street cars, rail cars and the like, and is more particularly concerned with a resilient wheel having rubber discs disposed between the rim and hub portions of the wheel in such manner that the rubber is placed in shear stress.

As is shown in the copending application of Robert J. Burrows and myself, Serial No. 89,927, filed July 10, 1936, disc wheels have been constructed in which the side cheek elements are so arranged as to provide uniform lateral compression on the rubber discs by employing a series of circumferentially spaced studs adjacent the outer periphery of the cheek elements which limit the lateral compression at this point, and provide for equalized compression at the inner and outer peripheries of the wheel structure.

The present invention is an improvement over resilient wheels of the general type disclosed in the copending application in that it provides for positive maintenance of this lateral compression by employing shouldered studs and a shouldered hub which insure that the lateral compression will be uniform throughout the radial extent of the rubber discs.

One of the primary objects of the present invention is to reduce the weight of the wheel assembly by eliminating the center web on the rim member, which normally extends between the resilient discs, thus saving materially in the cost of the wheel, reducing its weight, and eliminating the difficulties attendant upon making this web integral with the rim member.

In the present form of the invention I provide the resilient discs with one side plate of appreciable thickness formed of rolled stock, which projects outwardly a sufficient distance so that the periphery thereof may be riveted to a short radially extending flange on the rim member, and which thereby serves as the stress carrying member for transmitting the stresses from the rim member to the resilient discs, and from these discs to the hub of the wheel thus loading the discs in shear. This is of distinct advantage as it simplifies the construction, while at the same time reduces the cost materially over wheels of previous types.

Another important advantage secured by the present invention is the provision of means for causing air to circulate about the rubber discs which provides for maintaining the same cool, and thus increases the life of the rubber members appreciably. In the preferred form of the invention, this is accomplished by providing lateral inlets at the inner periphery of the side cheek elements for admitting air thereto about the hub of the wheel. This air is directed radially between the two resilient members, and is discharged outwardly about the outer peripheries of the side cheek elements to provide a circulation of air which will maintain the resilient members at a cool operating temperature and thus materially prevent deterioration thereof. In addition, I preferably employ spacing bars between the adjacent side plate members which are vulcanized to the resilient discs, and which form the stress transmitting members between the rim and hub, which spacer bars act as fan blades for assisting in the circulation of air, thereby insuring that the air will be forced around the rubber discs and will maintain the same cool.

As an added feature in conjunction with the air cooling of the wheel, I provide an improved means for securing the fan blades to the side plate elements of the resilient discs in such manner as to facilitate the assembly of the wheel structures and to provide proper location of these blade elements. This is accomplished by spot welding or otherwise securing the blade bars to the opposite faces of the side plate members so that each member carries the same number of blade bars, but when the members are assembled they are rotated into position such that a blade bar of the opposite member is disposed intermediate the adjacent bars of the first member. This insures proper location of the blade bars adjacent the inlets, and also facilitates the assembly of the resilient discs and at the same time provides for proper spacing of these discs so that the uniform lateral compression desirable in the resilient members may be easily attained.

Another feature provided by the present invention is the reduction in weight of the assembly due to the provision of inlet openings in the side cheek elements and the elimination of a solid disc of metal between the two rubber discs, while at the same time not sacrificing to any extent the strength of the wheel assembly for the purposes to which it is to be used.

Another feature of the present invention is to provide simplified side cheek elements which may be formed as castings, and which are provided with suitable re-inforcing ribs for distributing the stress thereof so that the side cheeks will be rigidly maintained in position and will assure proper location and support for the resilient discs.

Other objects and advantages of the present invention will appear more fully from the following detailed description which, taken in conjunction with the accompanying drawing, will disclose to those skilled in the art the particular construction and operation of the preferred form of the present invention.

In the drawing:

Figure 1 is a sectional view through a wheel embodying the present invention; and Figure 2 is a view taken substantially on line 2—2 of Figure 1 and showing a portion of the wheel in elevation.

Considering now the specific embodiment of the invention, which has been illustrated in the drawing by way of example only and which exemplifies the advantages inherent in the present invention, I have provided a wheel hub 5 having an axial bore therethrough whereby the hub may be pressed onto an axle of a rail truck. The hub 5 is provided with a pair of oppositely facing axially spaced shoulders 6 and 7, which preferably have machined radial surfaces providing defining locations for the inner peripheral portions of the side cheek elements 8 and 9. The side cheek element 8 is formed as a casting having a central flanged opening 10 fitting about the annular surface of the hub 5 outwardly of the shoulder 6, and provided with a planar radial face, the inner edge of which engages the shoulder 6. The cheek element 8 is provided with rib portions 12 and 14, the rib portions 12 providing strengthening means for preventing lateral deflection of the cheek element, while the ribs 14 provide re-inforcements at the outer periphery of the cheek element where the circumferentially spaced spacing studs are employed to laterally compress the resilient discs. The element 8 is preferably rigidly secured in position by means of an annular weld 13 which maintains the element 8 in fixed position against the shoulder 6.

At the opposite end of the hub 5 the cheek element 9 is adapted to seat on the annular surface of the hub 5 adjacent the shoulder 7, and is moved into abutting engagement with this shoulder by means of the hub nut 15 which threads over the projecting portion 16 of the hub and laterally forces the cheek element 9 against the shoulder 7. The cheek element 9 is also provided with re-inforcing ribs 17 and 18, which function in the same manner as the ribs 12 and 14.

It will be apparent that by the provision of the shoulders 6 and 7, the inner edges of the cheek elements 8 and 9 are positively spaced a predetermined distance apart, and in order to maintain uniform lateral compression upon the resilient discs, indicated generally at 19 and 20, there is preferably provide a plurality of studs 22 having shouldered portions 23 spaced apart a distance equal to the spacing of the shoulders 6 and 7 less the thickness of the outer side plate members 24 which are vulcanized to the sides of the resilient rings 25 forming the rubber cushioning means. Vulcanized to the inner faces of the resilient rings 25 are plate elements 26 which are appreciably greater thickness than the plate elements 24, and which project radially beyond the outer peripheral edge of the side cheek elements 8 and 9 in such manner as to provide a channel within which the annular radially inwardly directed flange 27 of the rim member 28 is disposed and secured by means of the peripheral ring of rivets 29.

The rim member 28 may be formed with the flange 27 integral therewith, and opposite lateral faces of the flange are machined to fit within the outer edges of the plates 26.

The studs 22 have their opposite ends threaded to receive the nuts 30, which nuts engage the outer faces of the cheek portions within suitable spaces defined by the ribs 14 and 18, and serve to draw these cheek elements laterally toward each other a distance limited by the shoulders 23 on the studs, which produces positive radial alinement of the cheek elements in such manner that uniform lateral compression of the resilient rings 25 is secured throughout their radial extent.

As noted in Figure 2, the plate elements 26 are apertured, as indicated at 32, to provide a clearance space about the central portions of the studs 22 to accommodate relative radial movement of the rim member 28 with respect to the hub 5, which relative movement is cushioned by the shear stress imposed on the resilient rings 25 vulcanized to the side plates 24 and 26. It will be noted that the plates 26 serve as a means by which the radial stresses on the rim member 28 are transmitted to the resilient discs 19 and 20. The rubber rings are also provided with peripherally notched portions 33, as indicated in Figure 2, to provide clearance about the studs 22, but the plates 24 are provided only with apertures which fit about the projecting threaded portions of the studs 22 whereby the plates 24 are rigidly secured to the respective side cheek elements 8 and 9.

Considering now the air cooling feature provided in this type of wheel, the side cheek elements 8 and 9 are provided at circumferentially spaced points about the inner periphery thereof with inwardly directed openings 35 and 36, respectively, which may be cast therein during the casting of the elements 8 and 9.

The inner periphery of the plates 24 and 26 are also notched in a manner to aline themselves with the inlet openings 35 and 36, as indicated respectively at 37 and 38, with corresponding peripheral notches being formed in the resilient rings 25 to thereby provide transversely extending air inlet openings from the side cheek elements 8 and 9 to the space between the plates 26.

In order to insure radial outward movement of air between the plates 26 to the outer periphery of the resilient members 19 and 20, there is provided a series of bars 40 which are preferably square in section and which extend radially from the notched portions 32 of the plates 26 inwardly to the notched portions 38 of these plates. It is to be understood that the location of these bars is optional as they may be spaced intermediate the notched portions if so desired. These bars which are preferably spot welded to the face of the plate 26 serve as radial fan blades for forcing air entering through the inlets 35 to the space between the plates 26 radially outwardly to the notched out portions 32 of the plates where the air is discharged over the notched portions 33 of the resilient rings 25 and laterally to the sides of the rim member 28. Intermediate each of the bars 40 there is provided corresponding bar members 42 which are carried by the opposite plate member 26 and which are spot welded thereto so that each plate member carries a corresponding series of bars, the total number of bars corresponding to the corresponding number of studs 22, although of course this is optional. The bars 42 extend radially inwardly from the notched out portions 32 of the opposite plate 26 to a point circumferentially intermediate the notched portions 38 of the plate and provide additional fan blades intermediate the fan blades 40 for insuring proper movement of the air through the wheel assembly.

In assembling the structure thus far described, the side cheek element 8 is first forced over the hub against the shoulder 6 and is then welded in position as indicated at 13. The resilient elements 19 and 20 are then positioned so that the bars 40 carried by one of the plates 26 are disposed intermediate the bars 42 carried by the opposite plate 26, and these plate elements are then riveted to the rim member 28 by the rivets 29. The rim member with the resilient elements secured thereto is then placed in position with the resilient element 20 engaging the face of the side cheek element 8. The studs 22 are then bolted in position with respect to the side cheek element 28 to thus locate the resilient element 20 in position with respect to this cheek element, and the corresponding cheek element 9 is then forced over the hub against the shoulder 7. The opposite ends of the studs 22 are then bolted in position to secure the opposite resilient element 19 to the cheek element 9 and the lock nut 15 is threaded over the hub to force the inner end of the cheek element 9 against the shoulder 7, and to secure the same in fixed position. Inasmuch as the spacing between the shoulders 23 on the studs 22 is equivalent, with the thickness of the side plates 24, to the spacing between the shoulders 6 and 7 of the hub, it is obvious that uniform lateral compression of the resilient rings 25 is secured, and these rings are maintained in slightly compressed engagement during the operation of the wheel. When the wheel is then assembled on an axle of a rail truck, it will be apparent that vertical loads on the wheel will be transmitted to the resilient rings 25 through the plates 26 from the rim member 28, and thus will place the resilient rings 25 in shear stress for transmitting these loads through the side cheek elements 8 and 9 to the hub of the wheel.

The clearance about the studs 22 provides adequate space for accommodating this relative movement, and it will be noted that the thickness of the resilient rings 25 has been materially increased due to the advantages of the present construction to thereby afford an increased cushioning action for producing a softer ride of the vehicle supported by the wheels of the present invention. In other words, with the increased thickness of the resilient members 25 a greater degree of relative movement can be provided due to the fact that a greater amount of rubber is available for the shear stresses, and consequently the unit resistance in shear of the rubber cushions can be decreased to provide a softer cushioning action. Such softer cushioning action means a relatively greater amount of movement of the rubber, and in order to insure that the rubber will maintain long life without impairment of its resiliency, the air cooling means of the present invention serves admirably to maintain the rubber at a cool operating temperature to prevent the rapid deterioration thereof.

It is therefore believed apparent that I have provided a novel wheel assembly having a number of distinct advantages, such as decrease in weight, air cooling, and softer riding characteristics.

I am aware that various changes may be made in certain details of the present invention, and I therefore do not intend to be limited except as defined by the scope and spirit of the appended claims.

I claim:

1. In a wheel structure, a hub, side cheek elements projecting radially therefrom, a rim member, resilient discs interposed between said elements and said rim member including metallic plates vulcanized to the adjacent faces of said resilient members, and secured to the rim member and serving to transmit movement of the rim member to the cheek elements, the rim member terminating radially at a point beyond the outer periphery of said cheek elements.

2. The combination of claim 1 wherein spacing bars are secured to said plate members for maintaining them in axially spaced relation.

3. The combination of claim 1 wherein said cheek elements and said resilient members are provided with means for admitting air to the inner peripheral edges thereof, and said plate elements are spaced axially to provide for radial outward movement of said air therebetween to the outer peripheral edges of said resilient members.

4. In combination, a wheel assembly including a rim member, a hub member, radial discs of resilient material interposed between said members, and means axially spacing said discs and providing for circulation of air therebetween.

5. In combination, a wheel assembly comprising a hub having axially spaced radially extending cheek elements thereon, a pair of resilient discs therebetween having metallic side plates, one plate of each disc being secured to the adjacent cheek element and the other plate extending radially outwardly, a rim member secured to the peripheries of said other plates, and means in said cheek elements and between said other plates for circulating air about said discs.

6. A wheel assembly including a hub having a pair of radial cheek elements in axially spaced position thereon, resilient discs secured to the adjacent radial faces of said elements and spaced apart axially, and means constituting blades between said discs for forcing air out radially therebetween.

7. In combination, a car wheel having a hub, axially spaced radially extending cheek plates on said hub, a rim member having a radial inwardly extending flange having an internal diameter greater than the external diameter of said plates, resilient rubber discs having plates vulcanized to the sides thereof, one plate of each disc extending radially outwardly to engage a side face of the rim flange, and the other plate being secured to the adjacent cheek plate whereby said extended plates transmit the loads on said rim to said hub through said discs, and transverse spacing means between the adjacent plates of said discs.

8. The combination of claim 7 wherein both said extended disc plates terminate at a point radially spaced from the hub to accommodate movement of said rim relative to the hub.

9. The combination of claim 7 wherein said extended disc plates are spaced apart axially and said cheek plates have lateral openings therethrough to provide communicating air circulation paths.

10. A resilient car wheel structure comprising a hub having axially spaced radially extending cheek plates, a rim having a short radially inturned flange, resilient disc members between said plates and having side plates bonded thereto, one side plate of each member extending radially outwardly and secured to said rim flange, and radially extending circumferentially spaced bar members between said extended side plates, certain of said bar member being secured to one of said plates and the remaining bar members being secured to the other plate.

11. A resilient disc member for a wheel of the class described comprising a rubber disc having a central aperture therein, a thin metallic plate of the same radial extent as said disc bonded to one side thereof, a relatively thicker metallic plate bonded to the opposite side of said disc and having a radially outwardly extended peripheral portion, and radially extending circumferentially spaced bars secured to the outer face of said last-named plate.

12. Resilient means for cushioning a metallic rim relative to a hub having axially spaced radially extending cheek elements, comprising a pair of rubber discs having metallic plates bonded to opposite sides thereof and disposed between said cheek elements, the adjacent plates on said discs extending radially beyond said cheek elements and supporting said rim, the opposite plates of each disc being secured to said cheek elements, spacing bars extending radially between said extended plates and alternately secured to the faces thereof, and alined lateral openings in said cheek elements and the inner peripheries of said plates and discs whereby air may circulate therethrough and out radially between said extended plates between said bars.

13. A wheel comprising a rim, a hub member, axially spaced radial resilient discs therebetween, and means defining radial air passages between said discs.

14. A wheel comprising a rim, a hub, resilient discs supporting said rim on said hub, and spacing means between said discs forming a circumferential series of radial air passages therebetween.

15. A wheel comprising a rim, a hub, resilient radial discs supporting said rim on said hub, axial ports about said hub, radial ports between said discs, and axial ports at the radial outer ends of the radial ports.

16. A wheel comprising a rim, a hub, axially spaced radially extending resilient discs supporting said rim on said hub, and means between said discs for drawing air in axially at the radial inner edges of said discs and discharging it outwardly at the radial outer edges thereof.

ALFRED O. WILLIAMS.